United States Patent [19]

Scott et al.

[11] Patent Number: 5,631,522
[45] Date of Patent: May 20, 1997

[54] LOW SODIUM PERMEABILITY GLASS

[75] Inventors: Curtis E. Scott; Mohan Rajaram, both of Mentor; Joseph A. Shrawder, Solon, all of Ohio

[73] Assignee: General Electric Company, Schenectady, N.Y.

[21] Appl. No.: 437,843

[22] Filed: May 9, 1995

[51] Int. Cl.⁶ ............................. H01J 17/16; H01J 61/30
[52] U.S. Cl. ............................. 313/636; 313/571; 501/54; 501/64; 501/68
[58] Field of Search .................... 313/636, 569, 313/571, 579, 637; 501/54, 64, 68

[56] References Cited

U.S. PATENT DOCUMENTS

| | | |
|---|---|---|
| 2,080,262 | 5/1937 | Fuwa et al. . |
| 2,805,166 | 9/1957 | Loffler . |
| 3,527,711 | 9/1970 | Barber et al. . |
| 3,726,695 | 4/1973 | Beall et al. ............... 313/636 |
| 3,764,286 | 10/1973 | Antczak et al. . |
| 3,912,959 | 10/1975 | Muta et al. . |
| 4,047,067 | 9/1977 | Clausen . |
| 4,115,134 | 9/1978 | Rhodes . |
| 4,127,416 | 11/1978 | Lumby et al. . |
| 4,147,744 | 4/1979 | Rhodes . |
| 4,166,831 | 9/1979 | Rhodes et al. . |
| 4,182,972 | 1/1980 | Kaneno et al. . |
| 4,256,988 | 3/1981 | Coaton et al. . |
| 4,361,779 | 11/1982 | van der Steen et al. . |
| 4,373,030 | 2/1983 | Kaneno et al. . |
| 4,394,453 | 7/1983 | Dumbaugh, Jr. . |
| 4,492,898 | 1/1985 | Lapatovich et al. . |
| 4,495,116 | 1/1985 | Kaneno et al. . |
| 4,501,993 | 2/1985 | Mueller et al. . |
| 4,731,348 | 3/1988 | Gonzales-Oliver ............ 501/54 |
| 4,755,492 | 7/1988 | Greskovich et al. . |
| 4,757,236 | 7/1988 | Dakin et al. . |
| 4,761,390 | 8/1988 | Hartnett et al. . |
| 4,769,353 | 9/1988 | Greskovich et al. . |
| 4,783,615 | 11/1988 | Dakia . |
| 4,841,195 | 6/1989 | De With et al. . |
| 4,861,737 | 8/1989 | Prud'Homme van Reine et al. . |
| 4,972,120 | 11/1990 | Witting . |
| 5,023,506 | 6/1991 | Canale et al. . |
| 5,032,762 | 7/1991 | Spacil et al. . |
| 5,075,587 | 12/1991 | Pabst et al. . |
| 5,083,059 | 1/1992 | Graham et al. . |
| 5,138,228 | 8/1992 | Thomas et al. . |
| 5,187,412 | 2/1993 | El-Hamamsy et al. . |
| 5,196,759 | 3/1993 | Parham et al. . |
| 5,236,876 | 8/1993 | Van Hal et al. . |
| 5,258,691 | 11/1993 | Dakin et al. . |
| 5,270,615 | 12/1993 | Chang . |

FOREIGN PATENT DOCUMENTS

| | | |
|---|---|---|
| 80200406 | 5/1980 | European Pat. Off. . |
| 87201901 | 10/1987 | European Pat. Off. . |
| 91903617 | 2/1991 | European Pat. Off. . |
| 92106971 | 4/1992 | European Pat. Off. . |
| 94202486 | 8/1994 | European Pat. Off. . |
| 1194818 | 4/1969 | United Kingdom . |

OTHER PUBLICATIONS

*The Electrical Properties of Vitreous Silica*, by A.E. Owen, A.R.I.C. and Prof. R.W. Douglas, D.SC., F.Inst.P., F.S.G.T., 1959 (no month).

*Glas: Natur, Struktur und Eigenschaften*, by Horst Scholze, 1988 (no month).

J. Ilum. Eng. Soc. (U.S.), vol. No. 4, (Jul., 1972) "Design of Pulsed Alkali Vapor Lamps Utilizing Alumina, Yttria and Sapphire Envelopes."

*Primary Examiner*—Nimeshkumar Patel
*Attorney, Agent, or Firm*—George E. Hawranko; Stanley C. Corwin

[57] ABSTRACT

A glass composition, particularly well suited for use in constructing sodium containing lamp envelopes. The glass composition is comprised of silica doped with yttrium and/or cesium, preferably in combination aluminum.

21 Claims, 3 Drawing Sheets

LOW SODIUM PERMEABILITY GLASS

BACKGROUND OF THE INVENTION

This invention relates to a glass composition having a low sodium permeability. More particularly, this invention relates to a fused quartz or synthetic silica composition doped with aluminum, yttrium, cesium or mixtures thereof. The glass composition of the invention is particularly well suited to be used in the formation of an arc chamber in sodium containing metal halide lamps.

Throughout the specification, numerous references will be made to the use of the glass composition to form the arc Chamber of a sodium containing metal halide lamp. However, it should be realized that the inventive glass composition is also suited for use in other lamp applications and the semiconductor industry.

Metal halide arc discharge lamps in which the glass composition of this invention is beneficial when utilized to form the arc chamber include, but are not limited to U.S. Pat. Nos. 4,047,067 and 4,918,352 (electrode), and 5,032,762 (electrodeless), the disclosures of which are herein incorporated by reference. Metal halide lamps of this type are generally comprised of an arc discharge chamber surrounded by a protective envelope. The arc chamber includes a fill of light emitting metals including sodium and rare earth elements such as scandium, indium, dysprosium, neodymium, praseodymium, cerium, and thorium in the form of a halide, optionally mercury, and optionally an inert gas such as krypton or argon. U.S. Pat. No. 4,798,895, herein incorporated by reference, describes a representative metal halide dose which when used in combination with an envelope comprised of sodium resistant glass of the present invention, creates a superior lamp.

Particularly, it has been found that the life of metal halide lamps is frequently limited by the loss of the sodium portion of the metal halide fill during lamp operation via sodium ion diffusion through the arc chamber. More particularly, fused quartz and synthetic silica are relatively porous to a sodium ion, and during lamp operation, energetic sodium ions pass from the arc plasma through the chamber wall and condense in the region between the arc chamber and the outer jacket or envelope of the lamp. The lost sodium is then unavailable to the arc discharge and can no longer contribute its characteristic emissions, causing the light output to gradually diminish, and causing the color to shift from white towards blue. In addition, the arc becomes more constricted, and in a horizontally operated lamp, the arc may bow against and soften the arc chamber wall. Sodium loss may also cause the operating voltage of the lamp to increase to the point where the arc can no longer be sustained by the ballast and failure of the lamp may result.

In an attempt to reduce the effects of sodium diffusion through the arc chamber, the skilled artisan has historically relied on coating the arc chamber with sodium diffusion resistant materials. Attempts to solve diffusion problems have included depositing aluminum silicate and titanium silicate layers on the outside surfaces of the arc tube, as described in U.S. Pat. Nos. 4,047,067 and 4,017,163 respectively. Alternatively, U.S. Reissue Pat. No. 30,165 discloses applying a vitreous metal phosphate and arsenate coating on the inner surface of the arc tube. In contrast, U.S. Pat. No. 5,032,762 discloses beryllium oxide coatings.

While these methods have met with success in reducing sodium diffusion, the methods also require additional processing steps associated with applying a coating. Furthermore, the lamp's high temperature of operation, and frequently corrosive environment, may destroy the adherence between coating and arc chamber substrate. Moreover, cracking and/or peeling can result, exposing the quartz to sodium ions and allowing sodium diffusion to occur. Accordingly, it would be desirable in the art to have a glass material which reduces sodium diffusion without the application of additional coatings.

SUMMARY OF THE INVENTION

It is a primary object of this invention to provide a new and improved glass composition which is resistant to sodium diffusion. It is an advantage of this invention to provide a new and improved sodium diffusion resistant glass which is easy to manufacture and exhibits physical properties which permit formation of tubes and lamp shapes.

It is a further advantage of this invention to provide a new and improved glass particularly suited to be used to form an arc discharge chamber of a sodium containing lamp. It is a still further advantage of this invention to provide a longer-lived, higher quality, sodium containing lamp.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects in accordance with the purpose of the invention, the glass composition of the invention comprises quartz or synthetic silica, doped with either (i) about 20 to about 1000 ppm by weight cesium, (ii) about 20 to about 1000 ppm yttrium in combination with another oxide, (iii) about 20 to about 1000 ppm by weight cesium in combination with another oxide, or (iv) about 20 to about 1000 ppm by weight of a combination of cesium and yttrium in combination with between about 10 and about 1000 ppm by weight of another oxide; when the other oxide is selected from the group consisting of aluminum, dysprosium, niobium, erbium, and mixtures thereof. Preferably, the other oxide will be aluminum. Each of the above-referenced dopants will preferably be added and generally present in the glass in the form of oxides.

As utilized throughout this application, the term "glass" includes both "quartz" and "synthetic silica". More particularly, the inventive glass is directed to a composition comprised of a majority of $SiO_2$, interchangeably referred to herein as "synthetic silica" and "quartz".

In a particularly preferred application, the glass composition is formed from a high purity synthetic silica or a high purity fused quartz comprised of less than about 0.1 ppm by weight sodium, less than about 0.1 ppm potassium or lithium, less than about 0.2 ppm iron, and less than about 0.05 ppm chromium.

In a further preferred embodiment of the invention, the glass composition suited to be used to form an arc discharge envelope is comprised of the following, by weight: 50–99.9% $SiO_2$, 0.001–1.0% aluminum, 0–1.0% yttrium, 0–1.0% cesium, 0–0.0001% sodium, 0–0.0001% lithium and 0–0.0002% iron, wherein said yttrium and cesium comprise at least 0.001% by weight of said glass.

In a further preferred embodiment of the invention, the glass composition is utilized to form the arc discharge envelope of a lamp containing a fill including sodium.

BRIEF DESCRIPTION OF THE DRAWINGS

The invention consists in the novel parts, construction, arrangements, combinations, and improvements shown and described in the accompanying drawings which are incorporated in and constitute a part of the specification, illustrate one embodiment of the invention and, together with the description, serve to explain the principles of the invention.

DETAILED DESCRIPTION OF THE INVENTION

Reference will now be made in detail to the present preferred embodiment of the invention, an example of which is illustrated in the accompanying drawings.

While the invention will be described in conjunction with a preferred embodiment, it will be understood that it is not intended to limit the invention to that embodiment. On the contrary, it is intended to cover all alternatives, modifications, and equivalents which may be included within the spirit and scope of the invention as defined by the appended claims.

Figure 1:
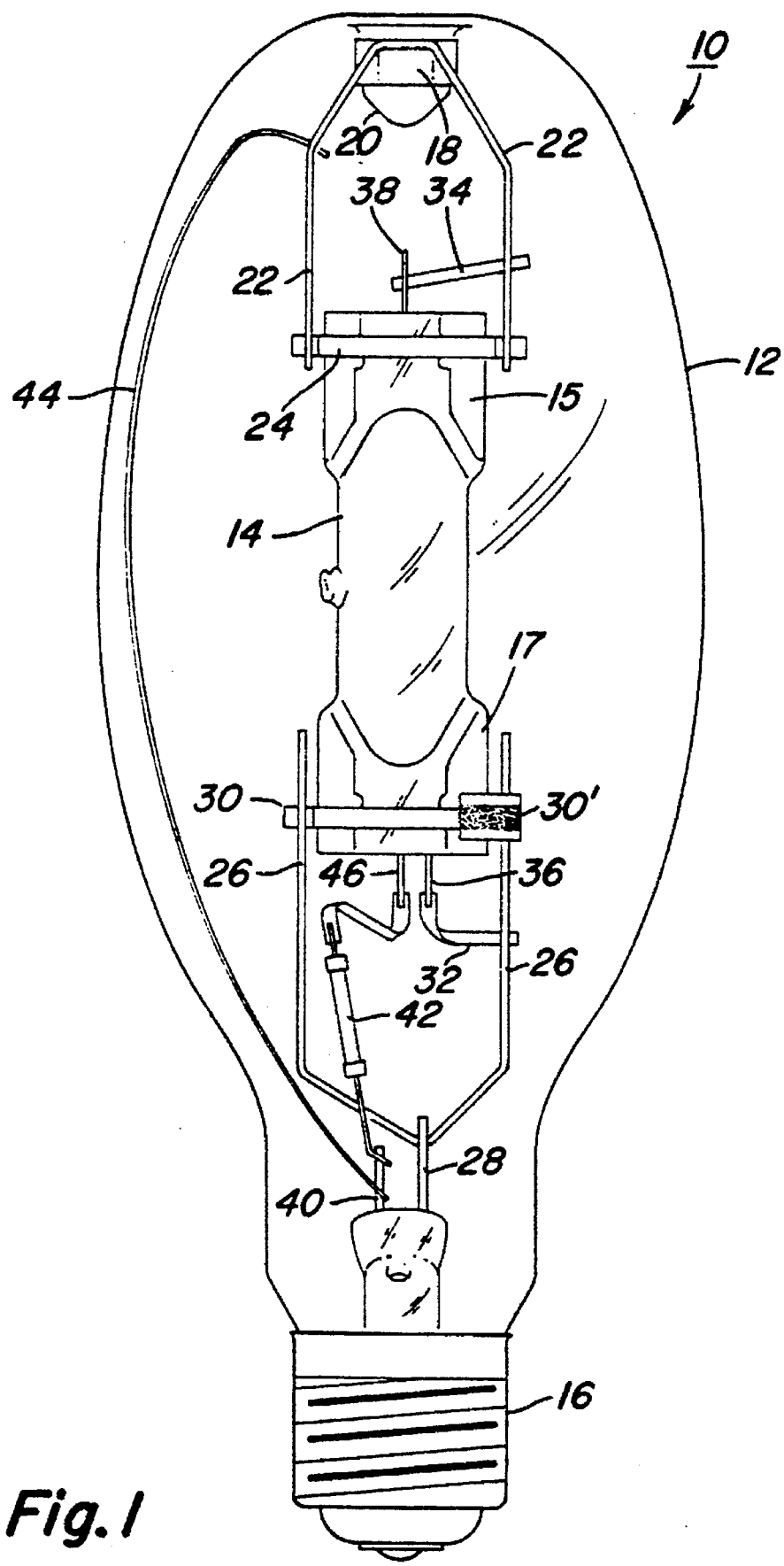
FIG. 1 is a schematic illustration of a metal halide arc discharge lamp including an arc discharge chamber formed of a glass composition in accord with the present invention.
Figure 2:
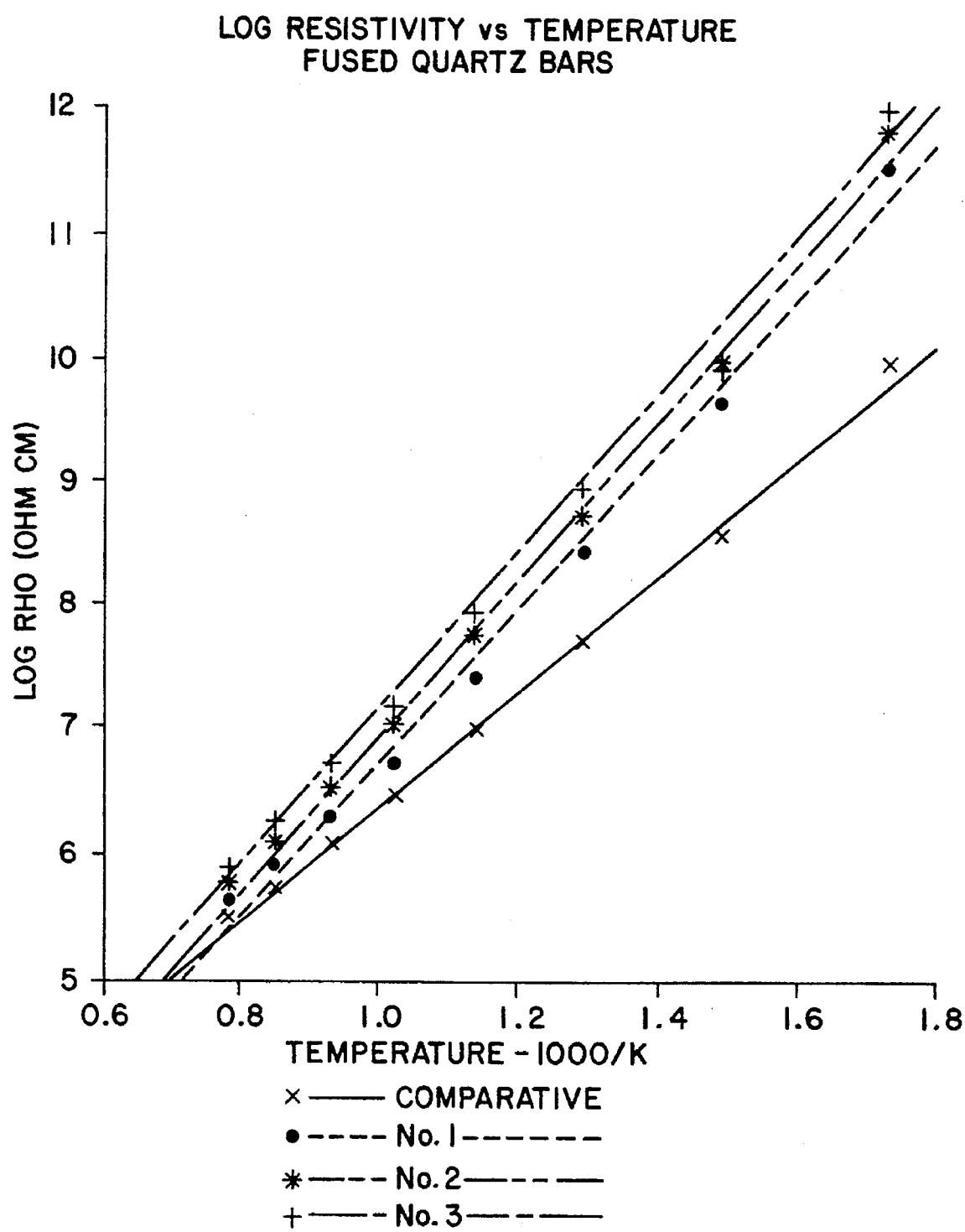
FIG. 2 is a graphical representation of the log volume resistivity of various fused quartz compositions doped with cesium and co-doped with aluminum and cesium in accord with the present invention and comparative examples; and, FIG. 3 is a graphical representation of the log volume resistivity of various fused quartz compositions co-doped with aluminum and yttrium in accord with the present invention and comparative examples.
Figure 3:
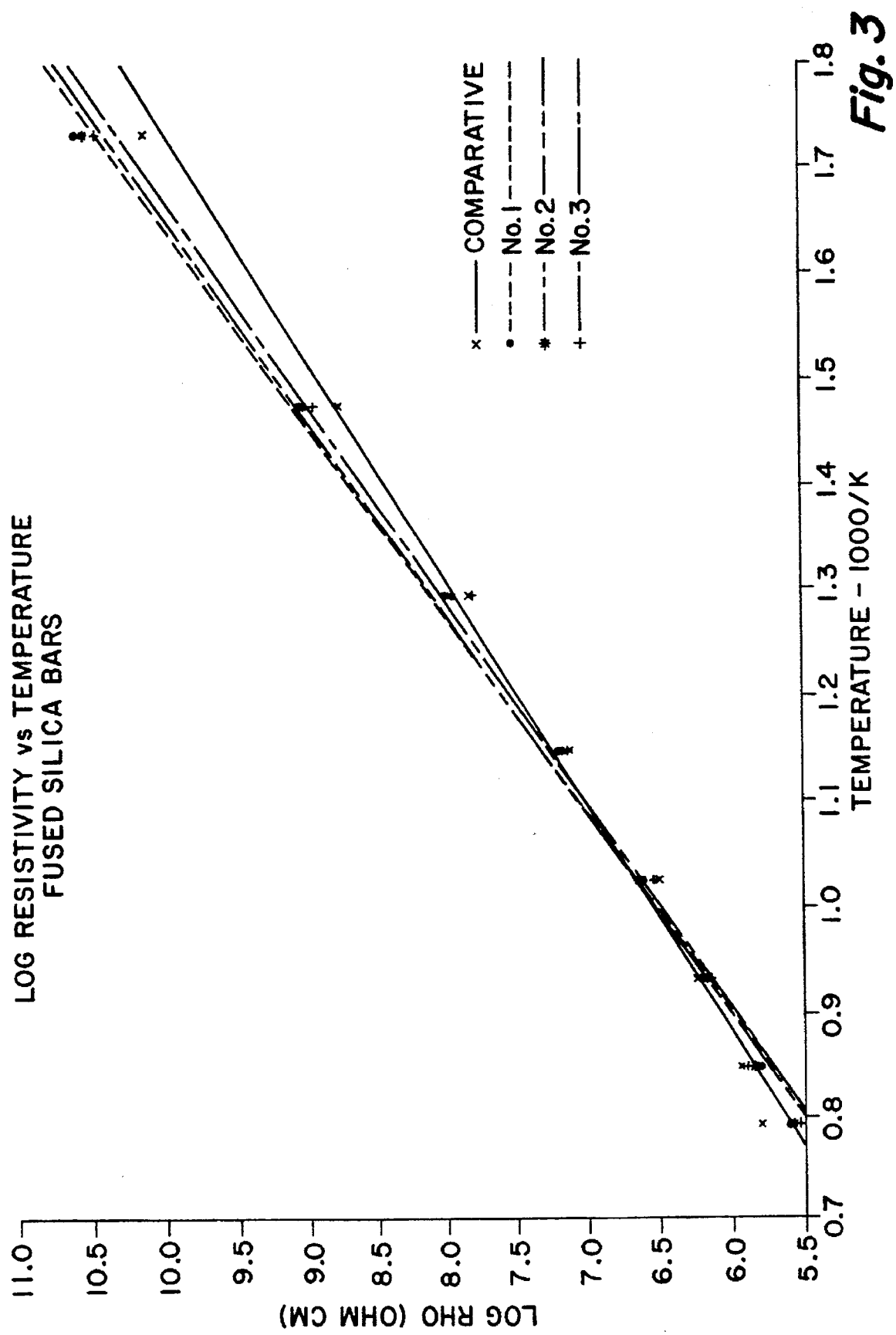

Referring now to FIG. 1, it may be seen that lamp 10 is comprised of an outer envelope 12 made of a light-transmissive vitreous material and a light-transmissive arc chamber 14 made of fused silica or fused quartz doped with aluminum, yttrium, and/or cesium in accord with the present invention. Lamp 10 further comprises a base 16 having electrical contacts as recognized by those skilled in the art for making electrical connection to the electrodes in arc chamber 14. Although the lamp shown in FIG. 1 is an electroded lamp, the inventive glass composition is equally suitable to form the arc chamber of an electrodeless lamp.

In fact, it is envisioned that the glass composition of the present invention is suitable for any application in which sodium diffusion or electrical resistivity is a problem, for example the manufacture of any type of lamp envelope, semiconductor tubing, or semiconductor crucibles.

In the embodiment shown, the arc chamber 14 is held in place within envelope 12 by frame parts comprising a spring clip metal band 18 surrounded by a dimple 20 and envelope 12. Support 22 is spot welded to band 18 and also spot welded to strap member 24. Strap member 24 is securely and mechanically fastened about the pinched seal regions 15 and 17 of arc chamber 14. The other end of the arc chamber is secured by support member 26 which is spot welded at one end to electrically conductive terminal 28 and welded at the other end to strap member 30. Strap member 30 is securely and mechanically fastened about the second pinched seal region 17 of the arc chamber 14. Conductive members 32 and 34 are spot welded at one end to support members 26 and 22, respectively, at the other end to inleads 36 and 38, respectively, of the respective arc chamber 14 electrodes (not shown). Electrically conductive member 40 is spot welded to resistor 42 and current conductor 44. The other end of resistor 42 is connected to the inlead 46 of a starting electrode (not shown). Except for conductor 44 and inleads 36, 38, and 46 which are made of molybdenum, the actual resistor portion of resistor 42, all of the frame parts may be made of a nickel plated steel. The lamp also contains a getter strip 30' coated with a metal alloy material primarily to get or absorb hydrogen from the lamp envelope.

In the present preferred embodiment of the invention, the arc discharge chamber 14 is constructed of a glass comprised of fused quartz or synthetic silica doped with cesium, aluminum and yttrium, aluminum and cesium, or aluminum and a mixture of yttrium and cesium. In addition, the preferred quartz or silica has a very low sodium content.

Without being bound by theory, it is believed that alkali metals present in glass act as a migration site by which a sodium ion in the lamp fill can diffuse through the quartz or synthetic silica chamber walls. Since this diffusion from the high energy, high temperature inner wall to the exterior wall of the arc chamber destroys lamp function, it is desirable to minimize these channels and to block sodium ion migration paths. It has been found that cesium and yttrium function to block and/or substantially slow the sodium ion diffusion. Moreover, sodium ions are either not attracted to these sites or once present are bound tightly to slow or stop migration. It has also been discovered that the addition of another oxide, preferably aluminum, can improve workability in the cesium and/or yttrium doped glass to avoid undesirable devitrification. Particularly, it is believed $3^+$ ions can be added to the Si lattice of Cs or Y doped glass to raise the viscosity and prevent devitrification. These ions may include Al, La, Dy, Nb, and Er, typically added in the form of oxides.

In a further preferred embodiment, it is believed that maintaining a low level of sodium ion concentration in the fused quartz or synthetic silica, preferably less than 0.1 ppm sodium, can minimize the diffusion channels.

In addition, for lamp applications, color and other functional properties are optimized when the quartz or silica contains only trace amounts of arsenic, boron, calcium, cadmium, copper, magnesium, manganese, nickel, phosphorous, antimony, zirconium, and any other common impurity generally obtained through processing conditions. Moreover, large quantities of these metals are preferably avoided to minimize their undesirable effect on lamp operation.

A variety of synthetic silica and high purity quartz is available which makes an appropriate starting material from which to form the subject glass composition. However, fused quartz such as purified GE 244, and fused silica such as GE 021, GE 098, and GE 095 available from the General Electric Company Quartz Department, are particularly suited for forming the glass of this invention.

Preferably, the fused quartz or fused silica is doped with (i) at least about 20 ppm by weight cesium and optionally with aluminum, or (ii) at least about 10 ppm by weight aluminum in combination with 0 to about 1000 ppm by weight yttrium and 0 to about 1000 ppm by weight cesium, provided that at least one of yttrium and cesium are present.

In a further preferred embodiment, the glass is comprised of between about 20 and about 500 ppm by weight aluminum, and between about 20 and about 500 ppm by weight yttrium. More preferably the glass is comprised of between about 20 and about 100 ppm by weight aluminum, and between about 50 and about 500 ppm by weight yttrium.

In an alternative preferred embodiment, the glass is comprised of between about 20 and about 500 ppm by weight aluminum and between about 20 and about 1000 ppm by weight cesium. More preferably, the glass is comprised of between about 20 and about 200 ppm by weight aluminum, and between about 20 and about 500 ppm by weight cesium.

When both aluminum and yttrium are used as dopants, a preferred embodiment of the invention can be described as a glass comprised of quartz or synthetic silica doped with yttrium and aluminum, wherein the yttrium to aluminum ratio is between about 1 to 10 and about 10 to 1, and preferably between about 1 to 10 and about 1 to 1. When both aluminum and cesium are used as dopants, the glass is preferably comprised of quartz or synthetic silica having an aluminum to cesium ratio between about 1 to 5 and about 1 to 1. More preferably, the ratio of aluminum to cesium is between about 1 to 2 and about 1 to 1.

As will be inferred from the above description of the invention, the dopants and the quantity in which they are present is selected to reduce the opportunity for sodium to diffuse through the glass. As is recognized by those skilled in the art, volume resistivity is an accepted means of evaluating the tendency of a glass to allow sodium diffusion. Preferably, the inventive glass composition has a volume resistivity of at least about $3.16 \times 10^{10}$ ohm/cm. (eq. log volume resistivity of 10.50). Accordingly, a preferred glass composition is comprised predominantly of $SiO_2$ doped with either cesium or a combination of aluminum and at least one of yttrium and cesium to provide a volume resistivity of at least about $3.16 \times 10^{10}$ ohm/cm (log volume resistivity of 10.50) at 300° C., and more preferably at least about $3.16 \times 10^{11}$ ohm/cm (log volume resistivity of 11.5) at 300° C.

To further exemplify the invention, but not to limit the scope, the following examples demonstrate advantageous properties of the inventive glass composition.

EXAMPLE 1

In preparing the samples, $Al_2O_3$ (from Reynold Aluminum, RC-HPT-DBM grade), $Y_2O_3$ (Rhone-Poulenc, 99.99% phosphor grade) and 20% by weight to total dopant Cabosil (Cabot Corporation, M-5 grade) were blended for 20 minutes in a Turbula mixer to achieve the dopant quantities (parts per million by weight) set forth in Table 1. Particularly, 1.8889, 9.4444 and 17.0000 grams of 1% $Al_2O_3$ in quartz sand and 11.5349, 6.6481 and 1.3776 grams of 1% $Y_2O_3$ in quartz sand were used in samples 1, 2, and 3, respectively, to achieve a dopant mixture.

The blended dopant mixture was made up to 200 g using GE A-07 quartz sand in a 500 ml plastic bottle. The bottle was then tumbled in a Turbula mixer for 20 minutes. The blended compositions were then fused at 1800° C. for 1 hour in rectangular molybdenum boats in a Brew furnace under a hydrogen atmosphere. Each sample was sliced and polished for electrical conductivity measurements according to procedure ASTM 257. The results of the volume resistivity testing in Log ohm-cm at various temperatures is displayed in Table 1.

TABLE 1

| Temperature (°C.) | Undoped Quartz Log ohm-cm | Sample 1 Al 50 | Sample 1 Y 450 | Sample 2 Al 250 | Sample 2 Y 250 | Sample 3 Al 450 | Sample 3 Y 50 |
| --- | --- | --- | --- | --- | --- | --- | --- |
| 304 | 10.12 | 10.59 | | 10.51 | | 10.46 | |
| 405 | 8.76 | 9.04 | | 9.00 | | 8.97 | |
| 505 | 7.81 | 7.97 | | 7.96 | | 7.82 | |
| 606 | 7.11 | 7.17 | | 7.18 | | 7.14 | |
| 706 | 6.52 | 6.60 | | 6.63 | | 6.57 | |
| 804 | 6.20 | 6.16 | | 6.17 | | 6.15 | |
| 903 | 5.92 | 5.81 | | 5.81 | | 5.81 | |
| 1000 | 5.77 | 5.55 | | 5.53 | | 5.54 | |

As is apparent, the samples doped with aluminum and yttrium demonstrated a significantly higher volume resistivity in the important temperature ranges than the undoped comparative example. As recognized by those skilled in the art, this evidences an increased resistance in sodium diffusion.

EXAMPLE 2

High purity fused quartz samples were doped with cesium and two different concentrations of combined cesium and aluminum and evaluated for volume resistivity relative to a comparative example of undoped fused quartz. 0, 3.8000 and 3.8000 grams of 1% $Al_2O_3$ in quartz sand and 1.4662, 2.9877, and 5.9201 grams of 1% $CsNO_3$ (ALFA Chemicals) in quartz sand and 20% by weight to total dopant Cabosil (Cabot Corporation, M-5 grade), respectively, were blended for 20 minutes in a Turbula mixer to yield a dopant mixture comprised of the quantities (in parts per million) set forth in Table 2.

The blended dopant mixture was made up to 200 g using GE A-07 quartz sand in a 500 ml plastic bottle and tumbled for 20 minutes in a Turbula mixer. The blended compositions were then fused at 1800° C. for 1 hour in rectangular molybdenum boats in a Brew furnace under a hydrogen atmosphere. Each sample was sliced and polished for electrical conductivity measurements according to ASTM 257. The results of the volume resistivity testing in Ohm-cm at various temperatures is displayed in Table 2.

TABLE 2

| Temperature (°C.) | Undoped Quartz Log ohm-cm | Sample 1 Cs 50 | Sample 2 Cs 100 | Sample 2 Al 100 | Sample 3 Cs 200 | Sample 3 Al 100 |
| --- | --- | --- | --- | --- | --- | --- |
| 304 | 9.94 | 11.48 | 11.71 | | 11.96 | |
| 400 | 8.51 | 9.63 | 9.93 | | 9.94 | |
| 505 | 7.66 | 8.39 | 8.66 | | 8.96 | |
| 604 | 6.97 | 7.37 | 7.68 | | 7.95 | |
| 703 | 6.44 | 6.68 | 6.96 | | 7.19 | |
| 802 | 6.05 | 6.25 | 6.45 | | 6.73 | |
| 901 | 5.72 | 5.90 | 6.05 | | 6.28 | |
| 1001 | 5.48 | 5.62 | 5.73 | | 5.91 | |

As is apparent, the samples doped with cesium or a mixture of aluminum and cesium demonstrated a significantly higher volume resistivity than the comparative sample. As recognized by one skilled in the art, these results evidence an increased resistance in sodium diffusion in the inventive glass composition.

EXAMPLE 3

Tubing (3 mm(OD)×5 mm(ID)) was formed from GE 021 quartz as a control and two doped cells were fabricated with dopant mixtures prepared according to the above procedures. Each set of tubing was constructed using production quartz furnaces at the GE Willoughby Quartz Plant, Willoughby, Ohio. Cell A (control) was made from GE 021 quartz., Cell B was made from GE 021 quartz doped with 50 wppm Al and 200 wppm Cs. Cell C was made from GE 021 quartz doped with 50 wppm Al and 450 wppm Y. The control and doped quartz tubing were then processed into 70 watt MXR metal halide lamps using the General Electric metal halide manufacturing processes at Ravenna Lamp Plant in Ravenna, Ohio.

Lamps were burned for 1000 hrs. to evaluate differences in performance between the quartz cells. Results are summarized in Table 1. Delta voltage refers to the change in voltage between 100 hrs. of lamp burning and 1000 hrs. The maintenance refers to the light levels at 1000 hrs., where the light levels were established as 100% at 100 hrs. Results are the average for test cell sizes of 10–12 lamps.

TABLE 3

MXR70 Watt Metal Halide Lamps Using Doped Quartz

| Cell | Quartz Type | Delta Voltage (1000 hrs.) | Lamp Maintenance (1000 hrs.) |
| --- | --- | --- | --- |
| A | GE 021 Control | +2.8v | 85.3% |
| B | GE 021 (50 Al, 200 Cs) | +0.7v | 87.5% |
| C | GE 021 (50 Al, 450 Y) | +0.7v | 91.4% |

The results show both doped cells (B, C) exhibit less voltage rise and improved lumen maintenance over the control which is indicative of less sodium loss during lamp operation.

Thus, it is apparent that there has been provided, in accordance with the invention, an arc chamber for a sodium containing lamp that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What we claim as new and desire to secure by Letters Patent of the United States is:

1. A lamp having a filament or arc discharge light source surrounded by an envelope wherein the improvement comprises said envelope being comprised of $SiO_2$ containing at least about 10 ppm by weight of a first element selected from the group consisting of aluminum in an amount less than 10.000 ppm, lanthanum, dysprosium, niobium, erbium, and mixtures thereof, and at least one of yttrium and cesium.

2. The lamp of claim 1 wherein said envelope is comprised of between about 20 and about 1000 ppm by weight of said first element and between about 10 and about 1000 ppm by weight yttrium.

3. The lamp of claim 2 wherein said envelope is comprised of between about 20 and about 500 ppm by weight of said first oxide and between about 20 and about 500 ppm by weight yttrium.

4. The lamp of claim 1 wherein said envelope is comprised of between about 20 and about 1000 ppm by weight of said first element and between about 10 and about 1000 ppm cesium.

5. The lamp of claim 4 wherein said envelope is comprised of between about 20 and about 200 ppm by weight of said first element and between about 20 and about 500 ppm by weight cesium.

6. The lamp of claim 1 wherein said first element, said cesium and said yttrium, if present, are predominantly in the form of oxides.

7. The article of claim 1, wherein said first element is aluminum.

8. The article of claim 7 further comprised of a ratio of aluminum to yttrium between about 1 to 10 and about 10 to 1.

9. The article of claim 8 wherein said ratio is between about 1 to 10 and about 1 to 1.

10. The article of claim 7 comprised of a ratio of aluminum to cesium between about 1 to 5 and about 1 to 1.

11. The article of claim 10 wherein said ratio is between about 1 to 2 and about 1 to 1.

12. A metal halide lamp having electrodes within a discharge envelope containing a fill including sodium, said envelope having substantially transparent walls comprised of $SiO_2$, 10–10,000 ppm aluminum, and at least one of yttrium and cesium in a total quantity of at least about 25 ppm by weight.

13. The lamp of claim 12 wherein said envelope is comprised of a total quantity of at least about 50 ppm by weight of at least one of yttrium and cesium.

14. The lamp of claim 12 wherein said envelope is comprised of less than 0.1 ppm by weight sodium.

15. A glass composition comprised of beneficiated quartz, about 10 to about 1000 ppm by weight of an element selected from the group consisting of aluminum, lanthanum, dysprosium, niobium, erbium, and mixtures thereof and about 20 to about 1000 ppm by weight yttrium.

16. A glass composition comprised of synthetic silica, about 10 to about 1000 ppm by weight of an element selected from the group consisting of aluminum, lanthanum, dysprosium, niobium, erbium, and mixtures thereof and about 20 to about 1000 ppm by weight cesium.

17. A glass composition comprised of beneficiated quartz, about 10 to about 1000 ppm by weight of an element selected from the group consisting of aluminum, lanthanum, dysprosium, niobium, erbium, and mixtures thereof and about 20 to about 1000 ppm by weight cesium.

18. A glass composition comprised of synthetic silica, about 10 to about 1000 ppm by weight of an element selected from the group consisting of aluminum, lanthanum, dysprosium, niobium, erbium, and mixtures thereof and about 20 to about 1000 ppm by weight yttrium.

19. A metal halide lamp having electrodes within a discharge envelope containing a fill including sodium, said envelope having substantially transparent walls comprised of $SiO_2$ and between about 25 ppm and 10,000 ppm by weight cesium.

20. A lamp having a light source surrounded by an envelope, said envelope constructed predominantly of a glass comprised of:

50 to 99.9 percent by weight $SiO_2$ 0,001 to 1.0 percent by weight aluminum 0 to 1.0 percent by weight yttrium 0 to 1.0 percent by weight cesium 0 to 0.0001 percent by weight sodium 0 to 0.0001 percent by weight lithium 0 to 0.0002 percent by weight iron wherein said yttrium and cesium comprise at least 0.001 percent by weight of said glass.

21. An article comprised of $SiO_2$, aluminum, and at least one of yttrium and cesium having a log volume resistivity of at least about 10.50.

* * * * *